United States Patent [19]

Slagel

[11] 3,755,262

[45] Aug. 28, 1973

[54] TRANSPARENT HIGH-IMPACT POLYURETHANE PRODUCTS

[75] Inventor: Edwin C. Slagel, Phoenix, Ariz.

[73] Assignee: Goodyear Aerospace Corporation, Akron, Ohio

[22] Filed: Jan. 15, 1971

[21] Appl. No.: 106,877

[52] U.S. Cl. ....... 260/77.5 AM, 135/5, 260/77.5 D, 260/77.5 SS, 264/338
[51] Int. Cl. ...................... C08g 22/06, C08g 17/13
[58] Field of Search ................ 260/75 NP, 77.5 AP, 260/77.5 AM; 161/190 KP

[56] References Cited
UNITED STATES PATENTS

| | | | |
|---|---|---|---|
| 3,464,935 | 9/1969 | Sepkoski et al. | 260/9 |
| 3,402,148 | 9/1968 | Sutker et al. | 260/75 |
| 3,553,174 | 1/1971 | Hausslein et al. | 260/77.5 |
| 3,554,962 | 1/1971 | Fischer | 260/45.8 |
| 3,590,002 | 6/1971 | Powers | 252/182 |

*Primary Examiner*—Hosea E. Taylor
*Assistant Examiner*—H. S. Cockeram
*Attorney*—F. W. Brunner and J. D. Wolfe

[57] ABSTRACT

A polyurethane and method of making said polyurethane which is characterized by being transparent and having good heat distortion and resistance to haze and impact.

3 Claims, No Drawings

TRANSPARENT HIGH-IMPACT POLYURETHANE PRODUCTS

This invention relates to optical polyurethanes that are either elastomeric or nonelastomeric in nature.

The prior art polyurethanes are colored and/or hazy and have not heretofore been considered suitable for replacing glass in its uses.

An object of this invention is to provide a method for making polyurethanes suitable for replacing glass in many of its uses and to said polyurethanes.

Polyurethanes of this nature can be prepared by forming a liquid polyurethane reaction mixture of the type hereinafter described and casting the liquid reaction mixture into a casting cell or shaper to yield a cured polyurethane having optical properties similar to those of glass but having some more desirable properties in other aspects. Unless the casting cell has been coated with a mold release the surface of the cast polyurethane will have to be trimmed and polished to present the optical properties of the cast polyurethane in its best aspect and in some cases to even develop them. On the other hand, if the surface of the casting cell has been coated with dimethyl dichlorosilane and the excess removed by wiping or polishing the surface of the casting cell, a polyurethane is obtained having a surface that is clear and transparent and the degree of optical distortion is reduced.

Best results are obtained where the casting cell is a smooth glass plate having essentially a monomolecular coating of dimethyl dichlorosilane or the residue left when dimethyl dichlorosilane has been contacted with water such as moisture in the atmosphere. Preferably the cast polyurethane is made in a glass mold formed between two glass plates having a spacer preferably of an elastomeric silicone sealed or held between the plates. It is preferred that the casting cell has a thin (essentially molecular) film of dimethyl dichlorosilane coating on the mold surface. This mold yields finished polyurethanes with the best optical properties, and the need to polish is minimized, although by polishing the optical properties can be improved.

The liquid polyurethane reaction mixtures suitable for making optical type polyurethanes are made by any of the well-known methods, for example, the one-shot or prepolymer method. The preferred mixture used comprises a nonaromatic polyisocyanate, and a reactive hydrogen containing polyol having an average of more than two hydroxyls per molecule, and preferably 3 but up to 4 can be used. Those reactive hydrogen containing materials having 4 hydroxyls tend to be a bit chalky and are thus easily marred whereas those polyurethanes made with the reactive hydrogen containing materials of 3 hydroxyls are preferred. It is desirable to use up to about 50 parts of a dihydroxyl material for each 100 parts of the tri or tetra hydroxy materials to improve the impact resistance in some instances, but as the amount of dihydroxyl material increases a loss in physical properties is noted. Higher amounts of dihydroxyl material up to about 65 to 75 percent may be used where good heat distortion is not a desirable property.

Of the nonaromatic polyisocyanates that can be used the cycloaliphatic polyisocyanates are preferred as those where the isocyanato group is connected to an aromatic ring through a non-benzenoid carbon atom such as the 70/30 meta-para-xylylene diisocyanate mixtures tend to react too fast and have such a high exotherm that big parts or sheets require special techniques to control the exotherm and reduce heat distortion.

Representative members of the alicyclic polyisocyanates are the cyclohexylene diisocyanates, the cyclopentylene diisocyanates, the methylene bis(cyclohexylisocyanates) and the isomeric mixtures of these, such as 4,4'-methylene bis(cyclohexylisocyanate) where the cis/trans ratio can vary rather widely as illustrated by the commercial products Nacconato H-12 and Hylene W.

Any of the reactive hydrogen containing materials having a hydroxyl functionality of 2 to about 4 and up to about 800 molecular weight can be used in this invention, depending on which of the following physical properties: heat distortion, closure on passage of a missile, antispalling aspects, ease of polishing, resistance to chalking or scratching or thermoforming and freedom from haze is desired or is not necessary to the specific used.

Normally about 4 to 8 equivalents of the organic polyisocyanate is used for each equivalent of the reactive hydrogen containing material. As the equivalent ratio of isocyanate to reactive hydrogen containing material goes below 3 the loss in physical properties, specifically heat distortion, is so severe that it is not possible to make satisfactory glass substitutes with ratios below about 3. The preferred range is 4 to 6 equivalents of organic polyisocyanate for each equivalent of reactive hydrogen containing material.

Preferably the reactive hydrogen containing materials contain less than five hydroxyls as the use of one containing four hydroxyls introduces a tendency to chalk or scratch more readily than the use of one containing only three hydroxyls. Also, as the hydroxyls go below an average of three, the heat distortion properties are reduced appreciably with the polyurethane showing a ready tendency to heat soften or fuse. Thus, if resistance to spalling or ballistic closure is desired, as little as five percent diol is desirable and up to about 25 percent and in some cases 50 percent can be used in a mixutre with other triols or quadrols.

Representative of the tetraols are pentaerythritol and its alkylene oxide derivatives where the alkylene radical has 2 to 10, and preferably 2 to 4 carbon atoms. A preferred class of the tetraols are pentaerythritol and its polyoxypropylene derivatives of about 200 to 600 molecular weight with the 300 to 500 molecular weight ones being desired where pseudoelastomeric properties or flexibility is desired. Two commercial polyoxypropylene derivatives of pentaerythritol are those available as PEP-450 (405 molecular weight) and PEP-650 (594 molecular weight).

Representative of the triols are such monomers as glycerol, trimethylol propane, trimethylolethane, hexanetriol and alkylene oxide derivatives thereof where the alkylene radical contains from 2 to 10 and preferably 3 carbon atoms. The molecular weight of the triols usually may be 600 or some higher, about 800, but the preferred range is 300 to 425, as the lower ones are usually highly refractive. The monomeric triols, as well as their alkylene oxide derivatives can be used in accordance with teachings of this invention.

A dihydric polyglycol carbonate, hydroxyl number of 120 to 200, can be used to replace from about 5 to 40 and preferably 10 to 25 percent of the triol or tetraol containing material. By incorporating the dihydric polyglycol carbonate into the formulation, an improvement in the impact resistance is noted with very little loss in tensile strength or heat distortion temperature. A trihydric polyglycol carbonate can be used in place of or in conjunction with the heretofore mentioned tri and tetra hydroxyl containing materials with excellent results.

Also, the lower molecular weight, usually less than 800, polyesters can be used alone or in admixture, but the polyethers are preferred. Representative of these are those obtained by condensation of the gylcols of ethylene, propylene, butylene, pentylene and hexylene with the polycarboxylic acids, preferably dicarboxylic, of the aromatic and aliphatic types where the acids contain from 2 to about 10 carbon atoms and preferably 4 to 8.

Any of the polyurethane catalysts can be used to advantage in this invention provided they do not affect the optical properties of the resulting polyurethane by contributing color or accelerated heat decomposition. Some additives in combination with antioxidants or stabilization agents have a synergistic effect on the properties. Specific examples of these are disteroxylthiodipropionate (DSTDP) and dilaurylthiodipropionate (DLTDP).

The metal catalysts are preferred, such as tin, cobalt, nickel and lead. The preferred metal catalysts are the organic tin catalysts. Examples of some of the compounds which are preferred include alkyl or aryl tin trihalogenides such as n-butyl tin trichloride, phenyl tin trichloride; dialkyl-or-diaryl tin dihalogenides such as di-n-butyl tin dichloride, dibenzyl tin dichloride, dilauryl tin dichloride, dioctyl tin dichloride, diethyl tin bromide, diphenyl tin dibromide, di-beta-chlorovinyl tin dichloride; trialkyl or triaryl tin halogenides such as triethyl tinchloride, trimethyl tin bromide, tri-n-propyl tin chloride, triphenyl tin chloride, tri-n-butyl tinchloride, tri-n-pentyl bromide, tri-p-chlorophenyl tin bromide. Other suitable acid engendering substances containing tin include stannous chloride, and tin salts of organic acids having up to 18 carbon atoms such as stannous acetate, stannous oleate, dibutyl tin dilaurate, dipropyl tin dilaurate, dibutyl tin diacetate, dibutyl dioleate, dimethyl tin diacetate, dibutyl tin di-(2-ethyl hexoate), diethyl-n-hexyl tin acetate, diethyl-n-butyl tin acetate, dimethyl-n-butyl tin acetate, dimethyl-n-octyl tin acetate, diethyl phenyl tin acetate, triphenyl tin acetate, triethyl tin acetate, tri-p-chlorophenyl tin acetate, diethyl-p-bromophenyl tin acetate, triethyl tin caproate, triethyl tin laurate, triethyl tin benzoate.

The preferred tin catalysts are the saturated ones such as dibutyl tin dilaurate or the homologues thereof wherein the alkyl group varies from 1 to 10 carbon atoms and the carboxylate group contains up to about 20 carbon atoms with the preferred range being 4 to 12 carbon atoms.

It has been observed that the tin octoates and related difunctional tin compounds exhibit a tendency to yellow on exposure for prolonged periods to sunlight or under ultra violet light as in a weatherometer test. Therefore, it is advantageous when catalysts of this sort are used to use stabilizers therewith to reduce or inhibit the tendency of these catalyst materials to introduce yellowing. A stabilizer specifically desirable is a substituted acrylonitrile available under the tradename Uvinul N-35. Other ultraviolet stabilizers that may be utilized are those which exhibit a tendency to absorb ultraviolet light in the range of 345 to 360 Nanometers. Also, the use of antioxidants of the multifunctional hindered phenol type is desirable as they function in this manner, too. One of the multifunctional hindered phenols specifically desirable are those available under the tradename Irganox 1010. The antioxidants and ultraviolet stabilizers preferably are incorporated into the polyol by heating at 180° to 200°F. before the polyol is reacted with the isocyanate.

It has been found desirable to utilize 0.005 percent to 0.009 percent of a silicone antifoam additive in these mixtures as this greatly improves the ease with which all the air is evacuated from the mixture and obtaining cast samples that are void free. A silicone antifoam additive available under the tradename SF-1080 is particularly desirable.

EXAMPLE I

Six equivalents of 4,4'-methylene bis(cyclohexylisocyanate) available as Nacconate-H-12 and one equivalent of polypropylene ether pentaerythritol of 405 molecular weight were added at about 160°F. to an agitator equipped reactor having a nitrogen blanket maintained over its vapor space. The contents of the reactor were raised to 185°F. with stirring and maintained at this temperature for 30 minutes to form a prepolymer. The prepolymer (130 parts) was cooled to 160°F. and mixed with 100 parts of polypropylene ether trimethylolpropane of 425 molecular weight, hereinafter referred to as TP–440, before being poured into a casting cell the mix was evacuated at 300 to 1,000 microns of Hg for 15 to 20 minutes. The casting cell was fabricated from two stretched Plexiglas plates with Plexiglas spacers to give a cell 0.5×8×8 inches having a cubical cavity of the above dimensions. The resulting cast sheet was cured at about 220°F. for 16 hours and then the clamps on Plexiglas plates were removed to permit the plates to be removed to expose the cast sheet. When the surface of the Plexglas sheets were coated with dimethyl dichlorosilane as a mold release agent and wiped free of excess mold release agents before the casting was made, the casting was clear and print could be read through it with little to no distortion.

This sheet could be polished with aluminum oxide of about 300 micron sizes with an air motor driven flannel buffing wheel to develop the desired optical properties and to remove any residual release agent from the surface of the casting.

Instead of using the prepolymer method described above the one-shot method can be used. When using the one-shot method, it is preferred to use a machine mixer such as an Admiral mixer to prepare the liquid polyurethane mixture which is then poured into the mold. The casting cell can be made also from glass instead of Plexiglas. In most instances glass is the preferred material for making the casting cells or molds. Of the many types of glass such as glazing quality, plate, safety and Tin Float, Tin Float glass appears to be superior as release of the casting was better and cell life was longer. Of the many polyurethane mold release agents, such as the silicone resins, nonsilicones, waxes, polyethylene and fluorosilicones, that can be used, they will all give satisfactory release but some tend to transfer to the casting and thus have to be removed. Also, the optically defective castings were increased in some cases and the need for polishing was more evident when using these mold release agents. But when the mold release agent was dimethyl dichlorosilane and its halogen and lower alkyl homologues, usually those having 2 to 9 carbon atoms, the optical properties of the casting was greatly improved. An additional advantage of using dimethyl dichlorosilane as a release agent is that several castings can be obtained before more release agents must be applied to the mold surface.

EXAMPLE II

The prepolymer (130 parts) of Example I was mixed with a 100 parts of a 425 molecular weight polyoxypropylene derivative of trimethylol propane, hereinafter called TP-440 and 0.03 parts of dibutyltin dilaurate, as a catalyst, and cast into molds to form sheets which were curing for the time and temperature indicated in Table 1. The physical properties of these cast sheets are shown in Table 1:

TABLE 1

| sample No. | cure time, Hrs. | cycle temp. °F. | Ultimate tensile Strength PSI/76°F. | Heat distortion °F. at 66 PSI | at 264 PSI |
|---|---|---|---|---|---|
| A | 16 | 220 | 8,193 | 190 | 175 |
| B* | 4 | 220 | 8,144 | 171 | 158 |
| C | 6 | 220 | 7,987 | | |
| D | 1 | 275 | 8,066 | | |
| E | 3 | 275 | | 181 | 169 |
| F | 4 | 275 | 7,500 | | |
| G | 4 | 220 | 1,849 at 200°F. | | |

*This sample had a tensile modulus PSI at 76°F. of 300,000.

EXAMPLE III

A one-shot polyurethane reaction mixture was made in an Admiral mixing machine and poured into suitable molds to make cast sheet. The following recipe was used in this example:

| | |
|---|---|
| Nacconate H-12 | 159.9 parts |
| Pep 450 | 20.2 " |
| TP-440 | 84.7 " |
| Trimethylolpropane | 14.3 " |
| Dihydric polyglycol carbonate | 20.9 " |
| Dibutyltin dilaurate | .08 " |

These samples were cured 4 hours at 275°F.; then the ultimate tensile and tensile modulus was run at 76°F. alone with the anticrack propagation value (K-factor) in pounds per inch$^{3/2}$ and Barcol hardness.

The average test values found were, 8,526 PSI ultimate tensile strength, 321,000 PSI tensile modulus, 2,000 anticrack propagation value and 82 to 84 Shore D hardness.

Example IV

A spall shield was made by making a one-shot polyurethane reaction mixture on an Admiral mixing machine and poured into molds to give sheets of the desired size and thickness. The recipe used was as follows:

| | |
|---|---|
| Nacconate H-12 | 268.0 parts |
| TP-340 | 148.0 " |
| P-750 | 184.0 " |
| Dibutyltin dilaurate | .08 " |

One of the samples was cured 6 hours at 220°F., then physical properties were determined at 76°F. The results of these tests were as follows: ultimate tensile strength — 5,085 PSI, tensile modulus — 220,000 PSI, anticrack propagation value — 3,427, and Shore D — 60. This sample successfully resisted the impact of a high velocity missile with little spall.

EXAMPLE V

A cast sheet was made using a prepolymer (119.0 parts) by reacting Nacconate H-12 (108.8 parts) with TP-340 (10.2 parts) and 100 parts of TP-440. These sheets were cured at the temperature and times indicated in Table 2. Also, the physical properties found on these samples after the cure cycle indicated is shown in Table 2 under Samples H to M.

Other sheets, Sample Nos. N to Q, were made using the same prepolymer but substituting 100 parts of TP-340 for TP-440 above. The physical values on these samples for cure cycle indicated is shown in Table 2.

Still more sheets, Samples R to W, were made using the above prepolymer but replacing the above curative with PEP-450. The physical values determined for the various cure cycles are shown in Table 2.

TABLE 2.—PHYSICAL PROPERTIES DATA

| Sample No. | Cure time, hrs. | Cycle temp., °F. | Ultimate tensile strength, p.s.i./76° F. | Heat distortion,° F. At 66 p.s.i. | At 264 p.s.i. | Anticrack propagation value [1] |
|---|---|---|---|---|---|---|
| H | 2 | 220 | 7,923 | | | 3,600 |
| I | 3 | 200 | 7,813 | | | 1,525 |
| J | 4 | 220 | | 167 | 156 | |
| K | 5 | 220 | 8,489 | | | 2,500 |
| L | 3 | 275 | | 180 | 169 | |
| M | 4 | 275 | 7,628 | | | 4,035 |
| N | 4 | 220 | | 214 | 205 | |
| O | 2 | 230 | 9,808 | | | 1,225 |
| P | 3 | 230 | 9,929 | | | 1,090 |
| Q | 5 | 230 | 10,217 | | | 1,280 |
| R | 3 | 230 | 10,240 | | | 976 |
| S | 2 | 230 | 10,074 | | | 840 |
| T | 5 | 230 | 10,476 | | | 892 |
| U | 4 | 220 | | 225 | 212 | |
| V | 3 | 275 | | 249 | 233 | |
| W | 4 | 275 | [2] 3,816 | ([2]) | | |

[1] (K-factor) [lb./in. 3/2].
[2] At 200° F.

It is essential that the cast polyurethanes obtained by the aforesaid methods be set and cured by curing at an elevated temperature for several hours, normally in excess of 150°F. for at least 8 to 16 hours. Preferred results are obtained when the cure is achieved at at least about 200°–275°F. by heating 1 to 20 hours.

It should be appreciated that where the sheets obtained are by the casting method aforedescribed of dimensions of approximately ¼ to 1 inch thick and are several feet long and wide, these sheets may be shaped, for instance, in the contour of a canopy of an airplane by suspending the sheets within a hot air oven at a temperature of 300°–400°F. for 5 to 20 minutes depending on the thickness and the specific characteristics of the polyurethane. Then this sheet may be removed from the oven and placed over a shaping form or jig and shaped to fit the contour of the jig to give a finished shaped article, for instance, having the contour of the canopy of the airplane. This shaping may be achieved by heat flow under the force of gravity but in many instances preferred results are obtained by utilizing a vacuum and maintaining the temperature within the thermoplastic range until the sheet has dropped to fit the contour of the shaper. Usually this is achieved within about 10–30 minutes, depending upon the temperature of the resulting material.

The polyurethanes produced by this invention are characterized by heat distortion of at least 120°F. to 290°F. at 66 pounds per square inch and 100°F. to 280°F. at 264 pounds per square inch, a Shore D hardness of 70 to 88, a light transmission of at least 90 percent and less than 2 percent haze.

To further illustrate the relationship of the optical polyurethanes relative to methacrylates or polycarbonate type optical materials, the properties of a stretched Plex 55 sheet and a Lexan 9400 sheet are compared with those of a transparent polyurethane sheet in Table 2. This transparent polyurethane sheet was prepared according to the method of Example I.

TABLE 2

| Properties | Plex 55 stretched | Lexan Type 9400 | Transparent Polyurethane |
|---|---|---|---|
| Tensile strength (psi) RT | 13,400 | 9,500 | 8,150 |
| 160°F. | 5,775 | 7,300 | 2,500 |
| –40°F. | 17,000 | 12,000 | 13,400 |
| Anti-Crack (K lb/in 3/2) | 2,900 | 6,000 | 1,345 |
| Heat distortion 264 psi °F. | 212 | 270 | 176 |
| UV Stability | Excellent | Good to Excellent | Good to Excellent |
| Weathering Resistance * | Excellent | Good to Excellent | Good to Excellent |
| Light Transmission % (¼" Thick) | 92 | 83 | 92 |
| Haze % | 1 | 3 | 1 |
| Flammability (in/min.) | .5 Self-Extinguishing | | 1.3 |
| Shore "D" Hardness | 90 | 83 | 84 |
| Chemical Resistance | Fair to Good | Poor | Good |
| Formability | Good | Good | Good |

* Exposed outdoors in Arizona for 9 months.

The dropping ball test, per Douglas Material Standard 1943 Sheet Plastic Shattering Method where a 2-pound ball is dropped from a height of 15 feet onto a test sample 0.25×12×12 inches demonstrates the superiority of this invention relative to polyacrylate glazes. The impact of a 2-pound ball falling from 15 feet shattered the cast Plex sheet, while a stretched Plex sheet passed the test of dropping a 2-pound ball but was shattered under the impact of a 4-pound ball falling from 15 feet. The transparent polyurethane sheet did not shatter even when subjected to a much more severe test, namely, the impact of an 11.22-pound ball falling from 15 feet. This test data shows this transparent polyurethane would be much more resistant to failure upon impact with a bird than the customary glazing used on aircraft.

It should be noted that the length of the heat treatment and elevation of temperature required to get a satisfactory cure is influenced by the amount of metal catalyst used. Normally, as little as 0.001 percent to about 0.1 percent of metal catalyst is used. When higher levels are used, the tendency for the polyurethane to develop haze or discolor is augmented.

TP–340 differs from TP–440 in that it has a lower molecular weight. Other polyether polyols of this type are polypropylene oxide derivatives of trimethylol ethane.

The light transmission and haze values of these optical polyurethanes were determined by using a Gardner Automatic Photometer. The color level of the cast sheet was determined, using a Gardner color standard for liquids (not that the same equipment is used for solids, too).

It is preferred that the reagents used in making these optical polyurethanes have an American Public Health Association color of 20 or less with the preferred color being no higher than 15. All parts and percentages are by weight unless otherwise specified.

While certain representative embodiments and details have been shown for the purpose of illustrating the invention, it will be apparent to those skilled in this art that various changes and modifications may be made therein without departing from the spirit or scope of the invention.

What is claimed is:

1. A polyurethane article characterized by a heat distortion of 120° to 290°F. at 66 pounds per square inch, Shore D hardness of 70 to 90, light transmittance of at least 90 percent and less than two percent haze and passes the 2-pound ball 15 foot test per Douglas Material Standard 1943 Sheet Plastic Shattering Method, said article being a reaction product of a reaction mixture consisting essentially of an equivalent of a reactive hydrogen containing material having an average of more than two hydroxyls but less than five hydroxyls per molecule and a molecular weight less than 800, three to eight equivalents of an organic polyisocyanate having the isocyanato groups attached to nonbenzenoid carbon atoms and about 0.9 to 1.0 equivalents of a curative consisting essentially of a polyol having a molecular weight of 90 to 800.

2. The polyurethane article of claim 1 wherein about 5 to about 40 percent of the reactive hydrogen containing material is a dihydric polyglycol carbonate.

3. The polyurethane article of claim 1 wherein the reactive hydrogen containing material is a polypropylene ether triol.

* * * * *